INVENTOR.
OTTO MEIXNER
BY
*Karl F. Ross*
ATTORNEY

Nov. 18, 1969      O. MEIXNER      3,478,804
MACHINE WITH ROTATING TOOLS FOR PREPARING WORN-OFF
PNEUMATIC TIRES TO BE RENEWED CIRCUMFERENTIALLY
Filed Sept. 23, 1966                 2 Sheets-Sheet 2
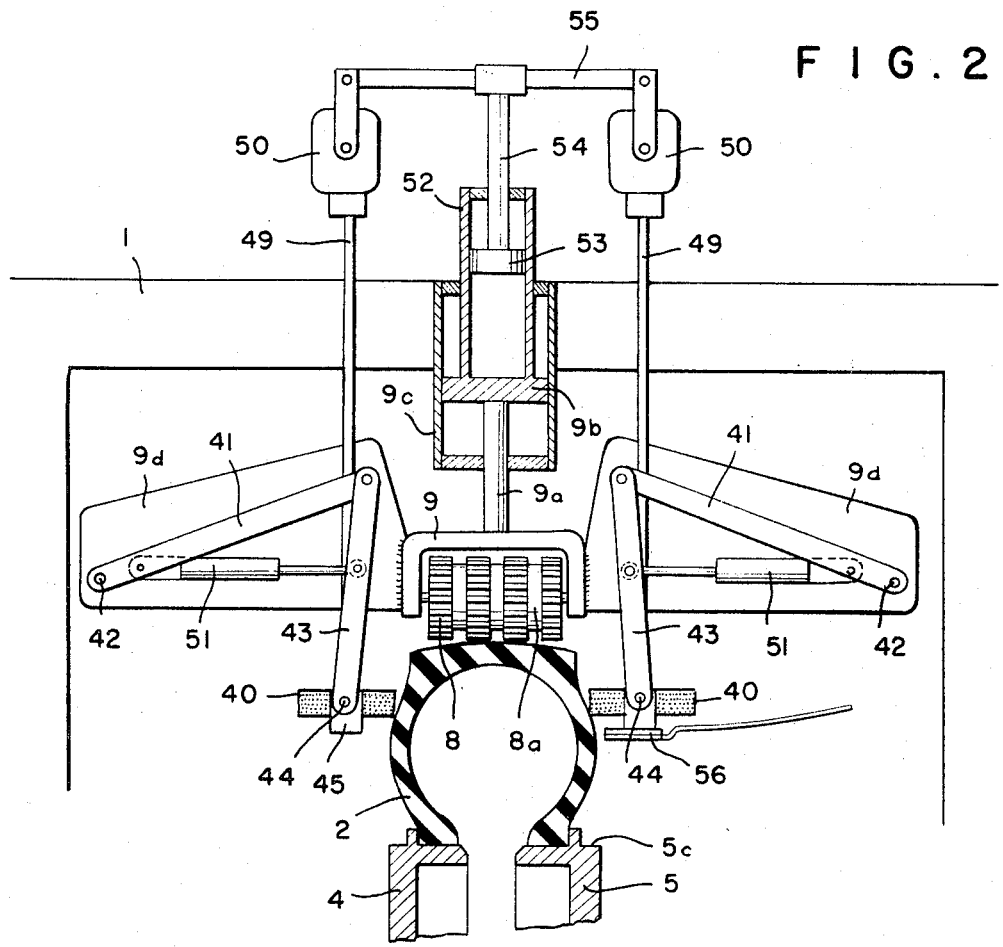
FIG. 2
FIG. 3
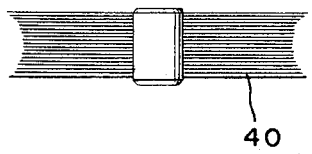
INVENTOR.
OTTO MEIXNER
BY
Karl J. Ross
ATTORNEY

United States Patent Office 3,478,804
Patented Nov. 18, 1969

3,478,804
MACHINE WITH ROTATING TOOLS FOR PRE-PARING WORN-OFF PNEUMATIC TIRES TO BE RENEWED CIRCUMFERENTIALLY
Otto Meixner, Westpreussenring 108A, Lubeck, Germany
Filed Sept. 23, 1966, Ser. No. 581,527
Claims priority, application Germany, Sept. 30, 1965,
C 37,013
Int. Cl. B29h 21/01
U.S. Cl. 157—13
7 Claims

ABSTRACT OF THE DISCLOSURE

A machine for preparing work tires for circumferential renewal having two rotating tools (e.g. brushes) which are engageable with the sidewalls of the tire and a drive roll engageable with the tread of the tire to rotate it. This drive roll is coupled with the tools so that as it descends onto the tire the tools descend next to the tire sidewalls. Each of the tools has a cylinder and is mounted on an articulated arm so that actuation of the respective cylinder moves it against the tire. A further cylinder is provided to reciprocate the tools together up and down radially with respect to the tire-rotation axis automatically.

---

Figure 1:
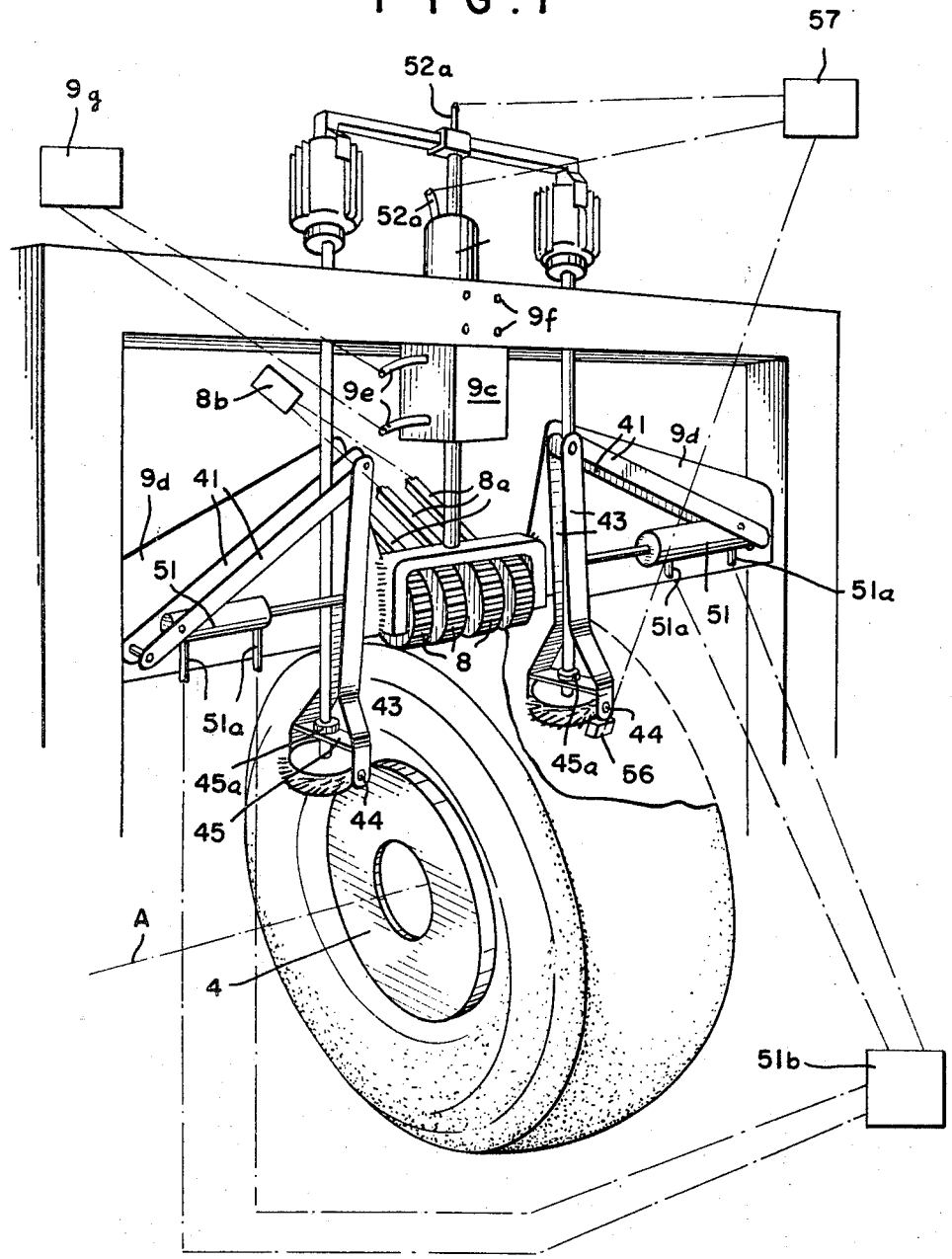

This invention relates to a machine with rotating tools for preparing worn pneumatic tires to be renewed circumferentially, in which the tire is clamped between two rim plates rotatable about a horizontal axis and driven by a serrated drive roll engaging the circumference of the tire.

Tire processing machines for material removing processing of tires to be renewed circumferentially are nowadays so constructed that the operating functions are substantially automatic. The operator merely has to clamp the tire and to adjust the processing tools, such as peeling knives, roughening tools etc., with respect to the tire. However, if no pattern is used the tools must be guided by the operator during the processing, an operation which has no influence on the total processing time of a tire. In this case it is impossible for the operator to simultaneously take care of a plurality of processing tools so that the per se desirable good of simultaneously using a plurality of different tire processing tools cannot be attained.

For obtaining the desired effect it is proposed according to the invention that two rotating processing tools or brushes are journalled for reciprocating movement toward and away from the tire median plane and are mounted on a support connected with a drive roll arranged in the upper part of the machine frame and engaging the upper apex of the tire. By arranging the rotating brushes in this manner it is achieved that they automatically engage the tire upon lowering the drive roll onto the tire and their operating range is determined by the position of the drive roll, which on the other hand means that upon lifting the drive roll the rotating brushes are removed from the tire, whereby the control of the brushes may be greatly simplified. In order to adapt the operating range of the brushes to the actual tire dimensions, i.e. to achieve that the reciprocating movement of the brushes does not go beyond the side surface of the tire to be treated it is proposed, according to another feature of the invention, that the reciprocating movement of the lateral processing tools is limited upwardly by stop means connected to the support, or the drive roll respectively, and downwardly in the direction towards the center of the tire by feeler means contacting one of the rim plates.

Thereby, in the first place, the movement of the tools, or brushes respectively, towards the center of the tire or the tire rotation axis is exactly limited and, in the second place, the movement away from the center is defined by the position of the drive roll, so that the side surfaces only of any size tire are engaged by the brushes. No adjustment or alignment whatsoever is required, and the operator may direct his full attention to the other machine functions. It is merely necessary to bring the brushes laterally into engagement against the tire; but this may also be accomplished fully automatically after the lowering of the drive roll, for example by one or two pneumatic or hydraulic cylinders.

One exemplified embodiment according to the invention shall be explained in detail is the following.

The drawing shows the upper part of a machine frame 1 which may be of any suitable construction. The tire 2 is received on two rim plates 4 and 5 rotatably journalled in the machine frame 1 about a horizontal axis A. In the upper part of the machine frame 1 a drive roll 8 is provided. This drive roll 8 may be urged against the circumference of the tire and is rotated by an electric motor 8b, for example by V-belts 8a arranged between the serrated circumferential zones of the roll 8.

In the illustrated embodiment the roll 8 is journalled in a fork 9. The fork 9 is connected to a piston rod 9a and a piston 9b arranged within a cylinder 9c rigidly secured to the machine frame 1 at 9f. The piston 9b is slidably guided in vertical direction and simultaneously in radial direction with respect to the tire axis A. Thus the drive roll 8 may be urged radially against the circumference of the tire or lifted off from the same, for example by feeding compressed air into the cylinder 9c through one of lines 9e, whereby at the same time the drive roll 8 is resiliently pressed against the tread of the tire. The lateral processing tools 40 are radially movably supported relative to the tire 2 on the support 9, or on bearing housings 9d respectively connected to the latter. In the illustrated embodiment each housing 9d has two parallel links 41 pivotally connected thereto, pivot points 42 of which are disposed remote of the tire. Downwardly extending arms 43 are pivotally connected to the free ends of the links 41, between the ends of which the rotating brushes 40 are journalled. The brushes 40 are each driven by electric motors 50 via vertically extending shafts 49, and are preferably rigidly secured to the shafts and thus rotate in a substantially horizontal plane. Adjacent the lower ends of the shafts 49 U-shaped forks 45 are disposed pivotally connected by pivot pins 44 to the arms 43. In this the ends of the shafts may terminate in swinging bearings 45a of the forks 45. In order to urge the brushes 40 laterally in contacting engagement against the tire, and in order to generate the required working pressure there are two compressed air cylinders 51 provided pivotally connected to the links 41, and having their piston rods pivotally connected to the arms 43 carrying the brushes 40. By means of these cylinders a pressure graduation is possible which is particularly important in case of processing white wall tires.

The up and down movement relative to the drive roll 8 and radially directed with respect to the tire 2 is achieved in the following manner:

A cylinder 52 is connected with the piston 9b. Therefore this cylinder follows the movements of the drive roll 8 and adjusts itself to the circumference of the tire. A piston 53 slidably guided within the cylinder 52 has a hollow piston rod 54 extending correspondingly sealed out of the top of the cylinder 52 and carries a yoke 55 from which the two electric motors 50 are pivotally suspended. The movement of the piston 53 is transferred by means of the two shafts 49 to the brushes 40, whereby the latter, by correspondingly pressurizing the cylinder 52, engage the lateral surfaces of the tire in an up and down movement.

The upward movement of the brushes is limited by a stop, or reversing switch respectively, connected to the support 9, or the drive roll 8 respectively, for example by the natural abutment of the piston 53 at the upper cylinder face wall. Thus the upward movement of the brushes does not go beyond the tire. Since the cross section of the tires have varying heights the lower stop of the brushes 40 must be independent of the support 9, or the position of the drive roll respectively. In an advantageous manner the lower stop may, for example, be formed by the rim plate 5. In practice this can be achieved in such a manner that one of the brushes 40, or its bearing 45a carries an electrical contact 56 which upon contacting the rim flange, or an outer shoulder 5c of the room plate 5, reverses the feed of the pressure fluid to the cylinder 52 through lines 52a. In this manner the rotating brushes 40 need never be adjusted to the tire. The shoulder 5c has, besides the aforementioned control function, the advantage that the processing tools, or their holding means respectively, still have sufficient clearance in the lowermost operating position to dress the lateral edges of the clamped tire, also adjacent the tire beads, sufficiently. In this, of course, the rim flange, or the rim edge respectively, disposed at the tire bead must be kept sufficiently narrow.

The brushes 40 are to adapt themselves, as mentioned, to the curvature of the side surfaces of the tire. To this end it is advantageous that the bristles of the brushes 40 are longer at the edges than in the middle. Thus practically a circumferential surface develops having in the middle a continuous recess or circumferential groove. By means of this it is simultaneously achieved that rubbing edge, curbstone edge or other projecting marks of the tire sides are acted upon twice and may be brushed away.

The machine is operated as follows:

A tire 2 is spanned between the plates 4 and 5. Then a control 9g is activated which feeds compressed air to the cylinder 9c through lines 9e to drop the drive roll 8 into contact with the tread of the tire 2. At the same time the piston 53 is pulled down in the cylinder 52 since as the piston 9b drops the pressure therein drops entraining the piston 53. Once the roll 8 is in contact with the tire 2 and the drive motor 8b is actuated to rotate it about the axis A and the brushes 40 are automatically in position adjacent the flanks of the tire 2 with their drives 50 running, the cylinders 51 are separately or jointly actuated at control 51b. Once this process has been completed a control device 57 automatically changes the pressure in the cylinder 52 via lines 52a to cause the brushes 40 to jointly oscillate up and down. Then the contacts 56 are actuated the direction of oscillation is changed, and when the piston 53 abuts the top of the cylinder 52 it is again changed. Thus the operator can take care of some other machine or phase of the operation as the flanks of the tire are automatically and evenly brushed.

What is claimed is:

1. A machine for preparing pneumatic tires for retreading comprising:
    mounting means for rotating a tire to be treated about a tire axis;
    a support shiftable transversely to said axis toward and away from said tire;
    drive means on said support engageable with said tire for rotating same about said axis;
    a pair of articulated arms hingedly mounted on said support on opposite sides of said tire and provided with free ends proximal thereto;
    a pair of rotatable processing tools mounted on the responsive free ends of said articulated arms for engagement with said tire for treating the surface thereof on opposite sides of said tire;
    a pair of drive members respectively coupled with said tools for rotating same about respective axes in an axial plane of said tire;
    a yoke spanning said drive members,
    first fluid responsive means engageable with said yoke for displacing same toward and away from said tire and jointly bringing said tools into engagement with and removing said tools from engagement with said tire; and
    second fluid responsive means including independently operable fluid-responsive elements mounted on said support and acting upon said arms for individually swinging said free ends toward and away from said tire.

2. The machine defined in claim 1 wherein each of said articulated arms includes a first link pivotally connected with said support at one end thereof, a second link forming an acute angle with the first link and hinged at the other end thereof, and a tool-support bracket rotatably receiving said tool and pivotally connected to said second link at a point remote from its hinged junction with said first link, said drive members being formed as shafts rigidly connected with said tools and engaging said brackets while extending past said first links between said one and said other ends thereof.

3. The machine defined in claim 2 which further comprises a pair of drive motors hingedly connected with said yoke and connected with said shafts for rotating same.

4. The machine defined in claim 1 wherein said mounting means comprises a pair of rim plates rotatable about said tire axis and engageable with opposite flanks of said tire, electrically operated control means for said first fluid responsive means, and contact means carried by the free end of one of said arms and engageable with the corresponding rim plate for triggering said control means to operate said first fluid responsive means and reciprocate said yoke.

5. The machine defined in claim 4 wherein said one of said rim plates is provided with a shoulder engageable with said contact means and providing clearance for the respective tool.

6. The machine defined in claim 1 wherein said first fluid responsive means includes a cylinder, and a piston reciprocable within said cylinder and extending outwardly therefrom while being formed an internal passage for delivering fluid to said cylinder.

7. The machine defined in claim 1 wherein said tools are brushes provided with a median continuous circumference groove.

References Cited

UNITED STATES PATENTS

| 2,815,073 | 12/1957 | Wikle et al. | 157—13 |
| 2,915,113 | 12/1959 | Van Sickle et al. | 157—13 |
| 2,939,520 | 6/1960 | Frohlich et al. | 157—13 |
| 2,979,123 | 4/1961 | Frohlich et al. | 157—13 |
| 2,996,110 | 8/1961 | Bosomworth et al. | 157—13 |

GRANVILLE Y. CUSTER, Jr., Primary Examiner